W. W. BALDWIN
Telegraph Insulator.
105625        PATENTED JUL 26 1870
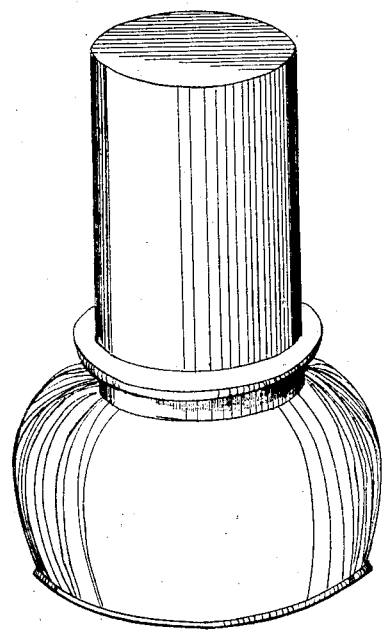
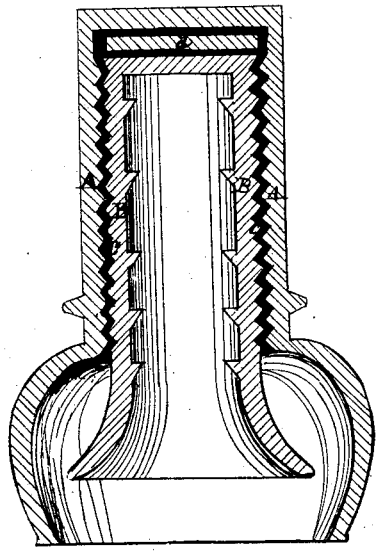

United States Patent Office.

WILLIAM W. BALDWIN, OF CLEVELAND, OHIO.

Letters Patent No. 105,625, dated July 26, 1870.

IMPROVEMENT IN TELEGRAPH-INSULATORS.

The Schedule referred to in these Letters Patent and making part of the same

*To all whom it may concern:*

Be it known that I, WILLIAM W. BALDWIN, of Cleveland, in the county of Cuyahoga and State of Ohio, have invented a new and useful Improvement in Telegraph-Insulators; and I do hereby declare that the following is a full, clear, and exact description thereof, sufficient to enable those skilled in the art to which my invention appertains to fully understand and to make and use the same, reference being had to the accompanying drawing, and forming part of this specification, in which—

Figure 1 is a perspective view.
Figure 2 is a vertical section.
Like letters of reference indicate like parts.

This invention consists in the arrangement of two cast-metal sections, A and B, and interposing between them a suitable insulating substance, C. The outside section or shell A is intended as a protection to the insulating substance, and to which is to be attached the telegraph-wire, while the inner section B is intended to be placed on a pin on a telegraph-pole, thus making a cheap, durable, and reliable insulator.

In the drawing—

A represents a cast-metal shell or case, which may be in size and form suitable for strength and taste. The inside surface of this shell may have a screw-thread or annular rings cut or cast on it.

B represents a second shell, having a screw-thread or ribs on its outer surface, and is sufficiently smaller than the outer shell A to provide space for the insulating substance C. The inside surface of the shell B also has a screw-thread or barbs upon it, which are intended to secure it to the pin upon which it is driven, and prevents its being easily pulled off.

The insulator used may be porcelain, gutta-percha, paraffine, wax, or other suitable substance, which will insure a disconnection of the electricity between the two shells.

The lower end or mouth of the shell A is made spherical and hollow, to provide space between it and the mouths of the shell B, which is made flaring or bell-shaped. The object of this is to prevent water or moisture getting in. If water should spatter up inside of the shell it can only moisten the pin, and under side of the shell B. The open space between it and the shell A prevents its reaching it.

In putting these shells together, the shell B is first wound around with cotton, or other suitable fabric, and it is then dipped into the insulating substance, coating it all over both inside and out. The inside of the shell A is also coated with the insulator. When the shell B is inserted in the shell A, and screwed down into place, a piece of glass, $d$, may be placed between the ends of the shells, so as to prevent the two metal surfaces coming in contact.

By this method of constructing a telegraph-insulator, the shells may be made of cast metal, or wrought, as may be most convenient, and the insulator is perfectly protected from the dangers of injury from without by the weather, thus making a very cheap, durable, and perfect insulator.

Having thus described my invention,

I claim—

The metal shells A and B, when constructed, combined, and arranged with the insulating material C, substantially in the manner shown, and for the purpose set forth.

WILLIAM W. BALDWIN.

Witnesses:
C. E. WYMAN,
J. HOLMES.